United States Patent
Häggander

(10) Patent No.: US 6,467,253 B1
(45) Date of Patent: Oct. 22, 2002

(54) NOZZLE STRUCTURE FOR ROCKET NOZZLES HAVING COOLED NOZZLE WALL

(75) Inventor: Jan Häggander, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 09/830,489

(22) PCT Filed: Nov. 27, 1998

(86) PCT No.: PCT/SE98/02169

§ 371 (c)(1),
(2), (4) Date: Apr. 27, 2001

(87) PCT Pub. No.: WO00/32920

PCT Pub. Date: Jun. 8, 2000

(51) Int. Cl.$^7$ .................................. F02K 9/97
(52) U.S. Cl. .................. 60/267; 165/169; 165/183; 239/127.1
(58) Field of Search .............. 29/890.01; 60/266, 60/267, 730; 165/169, 183, 166; 239/127.1, 127.3

(56) References Cited

U.S. PATENT DOCUMENTS

| | | | | |
|---|---|---|---|---|
| 2,697,588 A | * | 12/1954 | Jensen | 165/166 |
| 3,476,179 A | * | 11/1969 | Meister et al. | 165/166 |
| 3,533,467 A | * | 10/1970 | Rummel | 60/266 |
| 3,630,449 A | * | 12/1971 | Butler | 238/127.1 |
| 3,712,546 A | | 1/1973 | Kaufmann | |
| 4,591,534 A | | 5/1986 | Wagner et al. | |
| 4,781,019 A | * | 11/1988 | Wagner | 60/267 |
| 4,838,346 A | | 6/1989 | Camarda et al. | |
| 5,221,045 A | | 6/1993 | McAninch et al. | |
| 5,572,865 A | * | 11/1996 | Sackheim et al. | 60/267 |
| 5,832,719 A | * | 11/1998 | Riccardi | 60/267 |

FOREIGN PATENT DOCUMENTS

| | | |
|---|---|---|
| DE | 4301041 C1 * | 4/1994 |
| EP | 0374382 | 6/1990 |

\* cited by examiner

Primary Examiner—Michael Koczo
(74) Attorney, Agent, or Firm—Dickstein Shapiro Morin & Oshinsky, LLP

(57) ABSTRACT

The invention relates to a nozzle structure for rocket nozzles having a cooled nozzle wall comprising a large member of closely spaced cooling channels (2) extending from the inlet end of the nozzle to its outlet end. To facilitate the production of the cooled nozzle wall, it is suggested according to the invention that said nozzle wall consists of several elongated panels (11) which extend from the inlet to the outlet end of the nozzle and are joined together at their longitudinal side edges (7) and in each of which is formed a number of said cooling channels (2) which extend in the longitudinal direction of the panels (11).

8 Claims, 3 Drawing Sheets optional weld

NOZZLE STRUCTURE FOR ROCKET NOZZLES HAVING COOLED NOZZLE WALL

BACKGROUND OF THE INVENTION

The invention relates to a nozzle structure for rocket nozzles having a cooled nozzle wall comprising a large number of closely spaced cooling channels extending from the inlet end of the nozzle to its outlet end.

Such cooled rocket nozzles must have a nozzle wall which is both light and strong and which provides a uniform cooling effect. To achieve this, a large number of parallel cooling channels are arranged in the wall material of metal itself. The cooling channels can be formed either by machining the wall material and supplemental design measures or the nozzle wall itself can be made of a large number of closely spaced tubes which are joined together.

Also, the wall can be formed of a compound layer of two materials in which by various methods cavities are made, which in the compounded state form the channels.

Rocket nozzles of the above-mentioned type are known from for example U.S. Pat. Nos. 5,221,045, 5,386,628, 5,233,755, 4,942,653 and 3,768,256.

In addition to the fact that it is labor-intensive and time-consuming to build a nozzle wall of a large number—several hundreds—of thin tubes, such a nozzle also shows other drawbacks. Thus, it is hard to achieve the necessary strength of the structure in tangential direction if the tubes are joined to each other by brazing. Such tubes have also been diffusion bonded but reliable strength in tangential direction has not been reached.

In the case different ways of machining of the nozzle wall material are used to provide grooves or gutters which then are covered or combined with another layer of material to form the channels it is also difficult to make the final joining, for instance by welding, where the weld is exposed to the stress from the pressure of the coolant.

Another drawback of all the previously known nozzle structures is that the material used must have necessary strength and hence will have a relatively high density, such as stainless steel or nickel-based materials. Thus, the nozzles will be heavy. This is a great disadvantage, since the weight of the nozzle will reduce the payload capacity of the rocket.

BRIEF SUMMARY OF THE INVENTION

The object of the invention is to eliminate the drawbacks of the prior art and to provide a rocket nozzle which is much easier and faster to produce, the strength of which is greatly improved, but also to provide a lighter nozzle.

This is achieved according to the invention in that the nozzle wall consists of several elongated panels which extend from the inlet end to the outlet end of nozzle and are joined together along their longitudinal side edges and in each of which is formed a number of said adjacent cooling channels, which extend in the longitudinal direction of the panels.

Obviously, this results in a significant saving of time in that there is no need for the laborious work to put a large number of narrow tubes together and then join them along their length.

Since the cooling channels are arranged in panels, it has been found that according to a first embodiment of the invention, the panels for a nozzle wall structure for regeneratively cooled rocket nozzles can be made of a metal totally different from what has been used before, namely a metal that can be extruded, such as aluminium, alloys of aluminium or copper. This means that an additional simplification and saving of time is achieved. Regarding in the first place aluminium, the necessary strength of the panels can be ensured by a certain dimensional increase compared to stainless steel or nickel-based materials, but the total weight per surface unit will still be less than for said materials.

Experiments and calculations have proved that the high thermal conductivity, particularly of aluminium, makes the risk for overheating and melting, particularly at certain points, more or less non-existent. If necessary the inside of the nozzle can be coated with a ceramic thermal barrier coating as is known in the art.

The high thermal conductivity of the proposed materials makes the thermal stresses low. The structure of the nozzle remains elastic during the whole load cycle. The design and development of the nozzle is simplified by this.

According to a second embodiment of the invention the panel made of extrudable metal can be manufactured of two extruded panel parts, which are provided with suitable interengaging means, so that said panel parts will be locked together when said interengaging means are pushed axially into each other.

BRIEF DESCRIPTION OF THE DRAWINGS

A non-limiting example of the invention will now be described with reference to the accompanying drawings, in which.

DETAILED DESCRIPTION OF THE INVENTION

Figure 1:
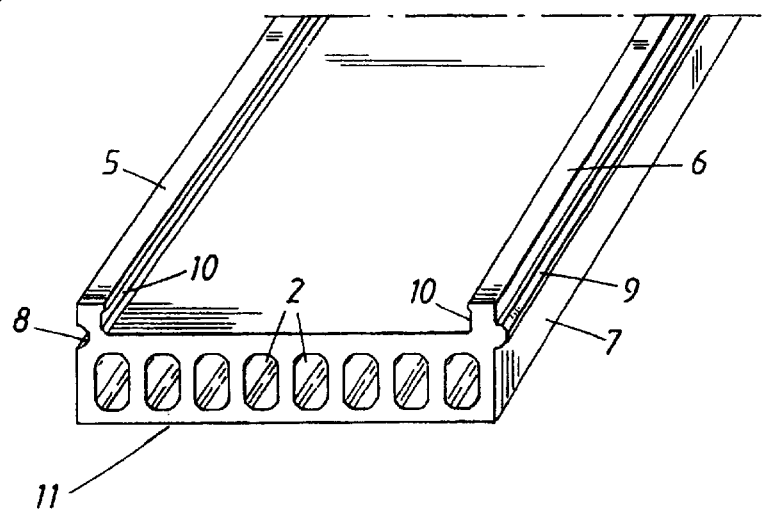
FIG. 1 is a broken perspective view of a panel according to the invention.

FIG. 1 shows a nozzle structure in the form of a panel 11 according to a first preferred embodiment of the invention. The elongated panel 11 is intended for forming a part of a nozzle wall for regeneratively cooled rocket nozzles or rocket nozzles having a cooled nozzle wall and extends continuously from the inlet end of the nozzle to the outlet end thereof, the intention being that a number of panels 11 are welded together longitudinally so as to form the entire rocket nozzle wall. The panel 11 is provided with a number of adjacent elongated parallel cooling channels 2, eight in the embodiment shown, which extend over the whole length of the panel and have for instance oval cross section.

According to a particularly preferred embodiment of the invention each panel 11 shown in FIG. 1 is manufactured in one single piece, preferably by extruding aluminium, alloys of aluminium, copper or other extrudable metals.

Figure 4:
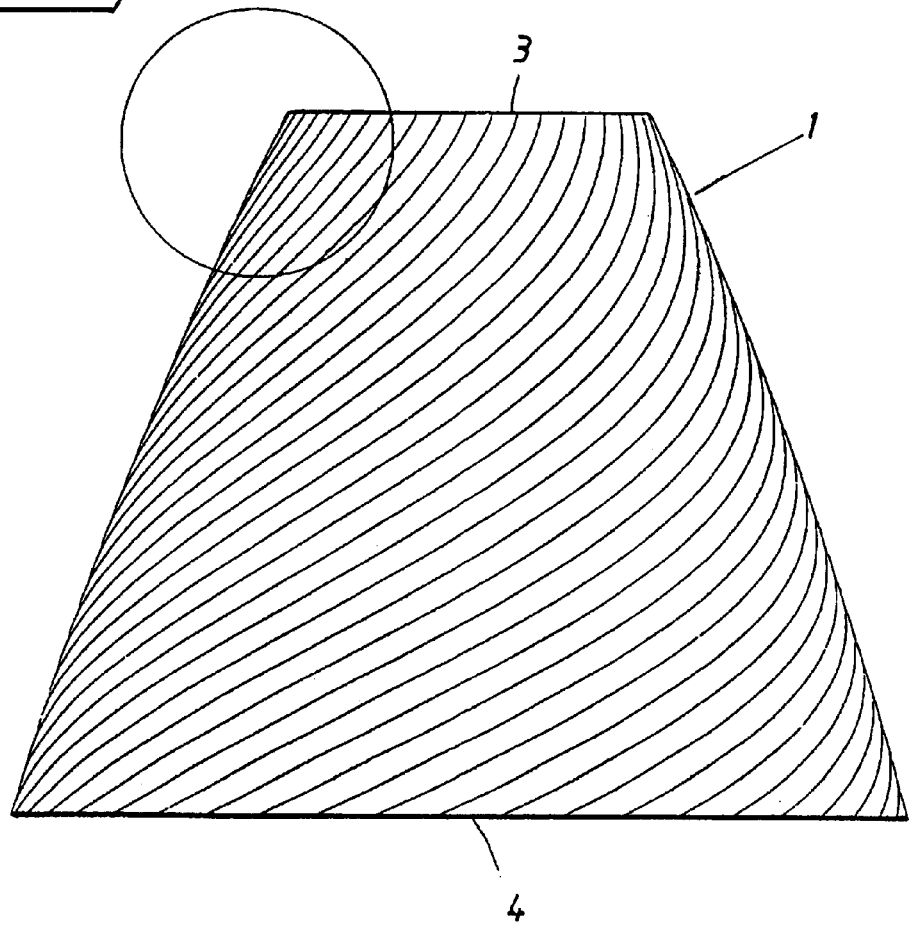
FIG. 4 is a side view of a bell-shaped rocket nozzle with spirally wound panels.

As shown in FIG. 4 the panels 11 extend in spiral form from the inlet end 3 of a nozzle 1 to the outlet end 4 thereof.

In a preferred embodiment the panel 11 is preferably also provided with flanges 5, 6 along its side edges 7 exteriorly thereof. These flanges 5, 6 have three objects, viz. to act as stiffening means against buckling of the finished nozzle, to provide a local increase of the thickness of material at the joint or weld between the panels, and to act as a means for urging together adjacent panels on a welding core (not shown) when producing the nozzle structure to be described below.

The flanges 5 and 6 shown in FIG. 1 are optionally provided with a groove 8 and a rib 9, respectively, at the edge side of either of the flanges and an inwardly directed notch 10 in each flange.

The groove 8 and rib 9, respectively, of the flanges in one panel 11 are adapted to engage the corresponding rib and groove, respectively, of the flange of adjacent panels for mutual alignment of said panels on a welding core, not shown, when the panels are to be welded to each other.

Figure 2:
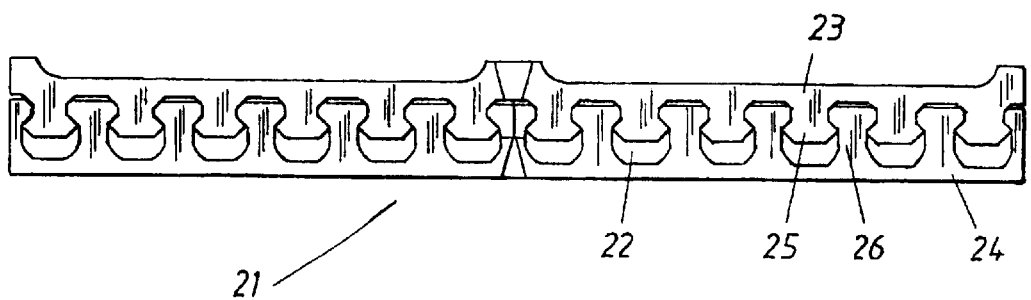
FIG. 2 is an end view of two panels welded together along their side edges, each panel comprising two extrudable panel parts.

FIG. 2 shows a second embodiment of two panels 21 according to the invention welded together. Each panel 21 is produced by extruding panel parts 23, 24 made of different or the same material, said panel parts being then pushed axially so as to nest together and preferably be held together by shape such as by a dovetail joint or similar interengaging means. The panel parts 23, 24 shown in FIG. 2 are each on one side provided with, for instance, a predetermined number of bars and grooves extending longitudinally of the panel parts. The bars 26 on one panel part 24 have greater height than the bars 25 on the opposite panel part 23, so that channels 22 are left between the panel parts 23, 24 when nested together. The upper panel part 23 shown in FIG. 2 constitutes the cold outside of the nozzle and forms in principle the supporting part of the nozzle, while the lower panel part faces the flame and is adapted for heat transfer. The compound panels 21 thus produced are exteriorly welded together along their longitudinal sides to form the nozzle, and the panels on the inside of the nozzle must also be welded together. This embodiment is particularly advantageous when the cooling channels 22 of the rocket nozzle have small cross section.

The embodiment of FIG. 2 is shown without flanges 5, 6 (see FIG. 1), but it is obvious to the artisan that this embodiment also can be provided with corresponding flanges, as described above.

Figure 3:
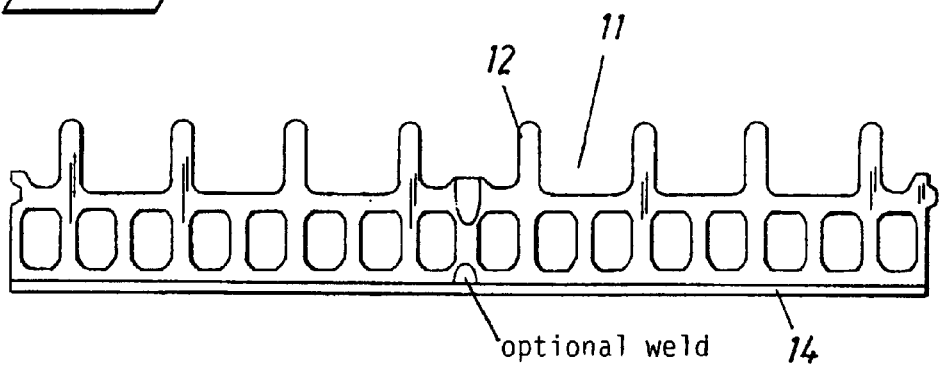
FIG. 3 is an end view of two panels welded together and provided on one side with a ceramic thermal barrier coating on the hot side of the finished nozzle and on the opposite side with reinforcing fins.

FIG. 3 shows a variant of the first embodiment in which the panels 11 are provided on that part, which forms the outside of the nozzle, with reinforcing fins 12, which serve to increase the stiffness of the nozzle and to transfer heat.

This Figure also shows that the panels can be welded together on the inside of the nozzle to increase the rigidity of the same, but this is not compulsory as is the case in the second embodiment.

Figure 5:
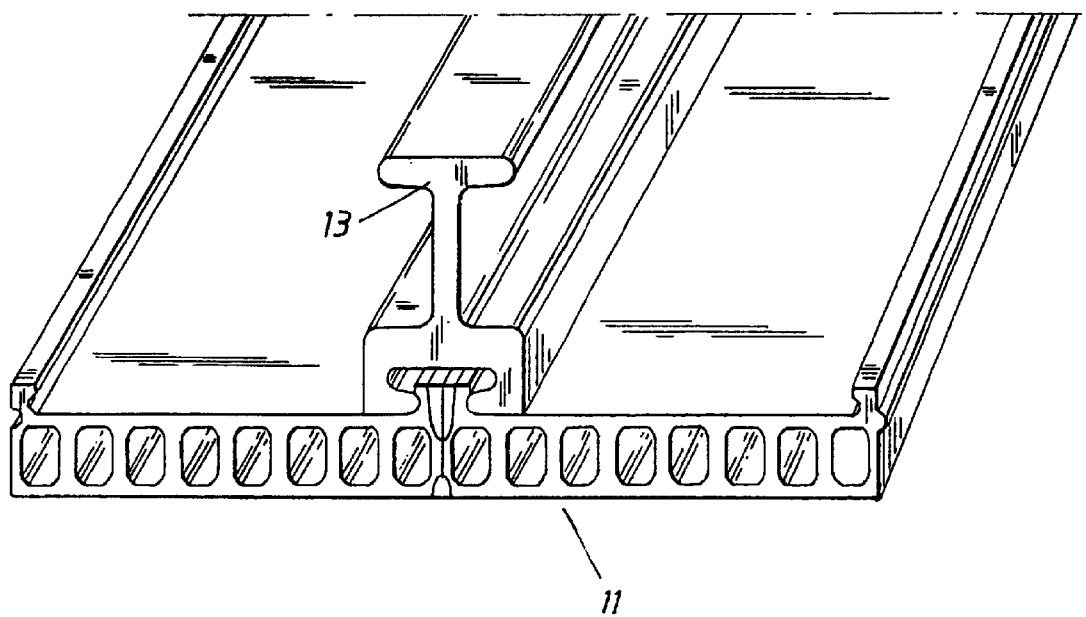
FIG. 5 is a broken perspective view of two panels welded together and provided with a locking means for holding the panels together.

In case the panels of the first or second embodiments are provided with flanges 5, 6 a longitudinal locking means 13 as the one shown in FIG. 5, can be slid over the joined flanges, from the outlet end of the nozzle to approximately half the height of the same, i.e. over the area where the stresses are at maximum, and welded to said flange.

Figure 6:
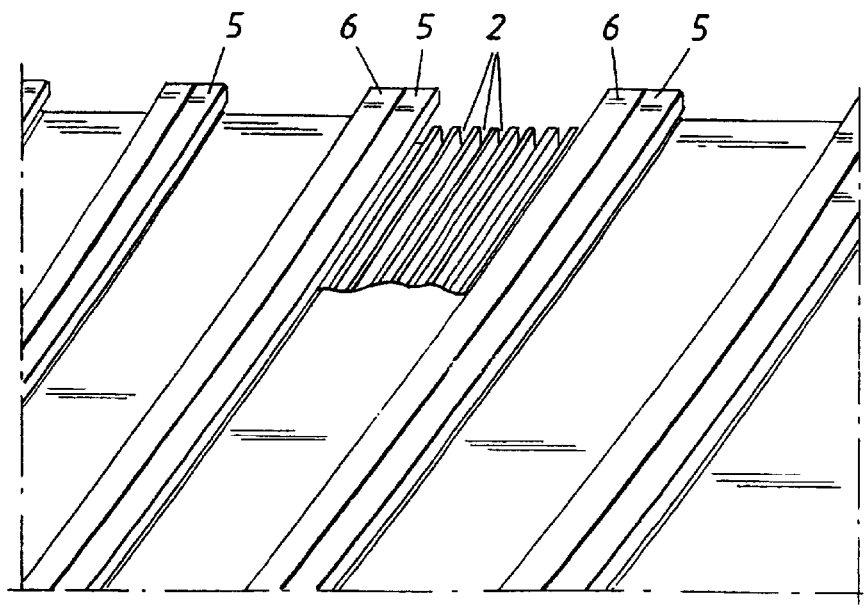
FIG. 6 is a part of FIG. 4 at larger scale showing the cooling channels in the spirally wound panels of the nozzle.

FIG. 6 shows at larger scale the panels forming the nozzle wall in which the cooling channels 2 are formed.

It is obvious to the artisan that the above-mentioned types of rocket nozzle on the inside can be provided with a thermal coating 14.

The part of the wall of the cooling channels in said panels according to the above-mentioned embodiments lying on the hot side of the nozzle can within the cooling channels be provided with surface-increasing means, not shown, for increasing the cooling efficiency and reducing the temperature of the material.

Although, the panels according to the invention are very well suited for producing bell-shaped rocket nozzles with a cooled nozzle wall, it is obvious to the artisan that it is also possible to produce, for instance, aero-spike nozzles (plug nozzles) or cone-shaped nozzles of said panels.

A method for producing a regeneratively cooled bell-shaped rocket nozzle with a cooling-channel-equipped nozzle wall, made of panels according to the first embodiment of the invention, in which said panels extend in spiral along the nozzle wall, will be described in brief below;

In the first step straight or pre-spiraled panels are mounted outwardly at the small end of a bell-shaped welding core, not shown, having the same shape as the finished nozzle, with a small tangential gap. The number of panels for a usual type of nozzle amounts to between 40 and 80, which can be compared with about 420 tubes for one type of nozzle produced today. The tangential gap between the panels is eliminated by adapting the angle of the panel to the axis of the nozzle, in the second step, in the case the panels are provided with flanges at their side edges, means for mounting the panels to each other can be slid over said flanges from the small end of the welding core, said means comprising for instance a first set of "forerunners" which partly bring the panels together. At the same time the welding core is rotated to initiate a spiraling of the panels. Then, the forerunners are pulled down further along said flanges and a new set of means is applied, which totally bring and mount said panels together. The grooves and ribs (see FIG. 1) of adjacent panels engage each other and secure said panels radially, and in the third step the first parts (small end) of the nozzle panels are welded together, whereupon the method according to steps 2 and 3 are repeated.

What is claimed is:

1. Nozzle structure for rocket nozzles having a cooled nozzle wall comprising a plurality of closely spaced cooling channels extending from the inlet end of the nozzle to its outlet end the nozzle wall including several elongated panels which extend from the inlet end to the outlet end of nozzle and are joined together at their longitudinal side edges and in each panel is formed a number of the adjacent cooling channels which extend in the longitudinal direction of the panels wherein the panels are arranged in spiral form in the nozzle wall.

2. Nozzle structure according to claim 1, wherein the panels are made of extrudable metal.

3. Nozzle structure according to claim 2, wherein the panels are made of extrudable aluminum or alloys of aluminum.

4. Nozzle structure according to claim 1, wherein each panel comprises two superimposed panel parts, each of the panel parts on one side being provided with a predetermined number of interengaging means so that, after the panel parts have been assembled in an axial sliding movement, the interengaging means hold the panel parts together, which interengaging means hold the panel parts together and extend in the longitudinal direction of the panel parts, the interengaging means on one of the panel parts having larger height than the interengaging means on the other panel part, so that channels are formed between the bottom of the grooves in the one panel part, which has the interengaging means with larger height, and the upper part of the interengaging means with less height of the other panel part in the assembled position of the panel parts.

5. Nozzle structure according to claim 1, wherein the panels are made in one single piece.

6. Nozzle structure according to claim 3, wherein each panel comprises two superimposed panel parts, each of which on one side being provided with a predetermined number of interengaging means so that, after they have been assembled in an axial sliding movement, the interengaging means hold the panel parts together, which interengaging means extend in the longitudinal direction of the panel parts, the interengaging means on one of the panel part having larger height than the interengaging means on the other panel part, so that channels are formed between the bottom of the grooves in the panel part, which has the interengaging means with larger height, and the upper part of the intergaging means with less height of the other panel part in the assembled position of the panel parts.

7. Nozzle structure according to claim 1, wherein the side edges of the panels are provided with flanges having means for aligning adjacent panels.

8. Nozzle structure according to claim 1, wherein the inside of the nozzle is coated with a thermal barrier coating.

* * * * *